United States Patent [19]

Yoshioka et al.

[11] Patent Number: 4,763,391
[45] Date of Patent: Aug. 16, 1988

[54] AUTOMATIC ASSEMBLING APPARATUS

[75] Inventors: Teruo Yoshioka, Yutaka Sato; Yuzo Abe; Shoji Nakano, all of Sayama, Japan

[73] Assignee: Honda Giken Kogyo Kabushiki Kaisha, Tokyo, Japan

[21] Appl. No.: 89,108

[22] Filed: Aug. 25, 1987

[30] Foreign Application Priority Data

Aug. 27, 1986 [JP] Japan ................................ 61-199014

[51] Int. Cl.$^4$ ............................................ B23P 21/00
[52] U.S. Cl. ..................................... 29/33 P; 29/771; 29/784; 29/787; 29/799
[58] Field of Search ............... 29/33 P, 771, 784, 786, 29/787, 799, 822

[56] References Cited

U.S. PATENT DOCUMENTS 3,076,257 2/1963 Svenson ............................ 29/783 X
4,506,441 3/1985 Yamanaga et al. .................... 29/787

Primary Examiner—Timothy V. Eley
Assistant Examiner—Frances Chin
Attorney, Agent, or Firm—Armstrong, Nikaido, Marmelstein & Kubovcik

[57] ABSTRACT

An automatic assembling apparatus is provided for assembling in sequence at least a first component and a second component to an article at an assembling station. The assembling apparatus comprises a first assembling jig for the first assembling component and a second assembling jig for the second component. An annular rail has the first and second assembling jigs mounted thereon such that they are circumferentially movable on the annular rail. The annular rail has a movable rail portion positioned opposite the assembling station which is movable to advance toward and retract from the assembling station. At least one supplying station is positioned with respect to the circumference of the annular rail for supplying components to the assembling jigs at the supplying station. Each of the assembling jigs and a corresponding component are positioned in sequence on the movable rail portion such that the advance movement of the movable rail portion moves the assembling jigs to an assembling position at the assembling station for sequentially carrying out the assembly of each component to the article.

5 Claims, 7 Drawing Sheets

AUTOMATIC ASSEMBLING APPARATUS

BACKGROUND OF THE INVENTION

1. Field of the Invention

This invention relates to an automatic assembling apparatus wherein at least two different components are assembled in sequence onto an article at an assembling station.

2. Description of the Prior Art

Generally in the prior art, a single type of component is assembled at each station on an assembly line for conveying an article to be assembled.

One type of prior art apparatus is disclosed in Kokai Publication No. Sho 54-47182 of Japanese Unexamined Patent Application. In the device disclosed therein, an assembling jig is provided with a holding device for a component and a nut runner is movable between a supplying position on the side of the assembling station, that supplies the component and an assembling position on the assembling station side. The component may thus be supplied to the assembling jig at the supplying position, and may then be assembled into an article at the assembling position.

With the foregoing type of apparatus, however, there is a problem wherein the assembly line has to be provided with a large number of assembling stations, resulting in an increase in the length of the assembly line.

When assembling two or more kinds of components at a single assembling station, an assembling jig can be provided with plural holding devices. However, this type of apparatus cannot be used when two or more kinds of components cannot be assembled simultaneously in view of the direction of assembling thereof, the order of assembling or the like.

SUMMARY OF THE INVENTION

It is the object of the present invention to provide an apparatus wherein two or more types of components can be assembled in sequence, at a high efficiency, to an article at a single assembling station.

The present invention is directed to an automatic assembling apparatus for assembling in sequence at least a first component and a second component to an article at an assembling station. The assembling apparatus comprises a first assembling jig for the first assembling component and a second assembling jig for the second component. An annular rail has the first and second assembling jigs mounted thereon such that they are circumferentially movable on the annular rail. The annular rail has a movable rail portion positioned opposite the assembling station which is movable to advance toward and retract from the assembling station. At least one supplying station is positioned with respect to the circumference of the annular rail for supplying components to the assembling jigs at the supplying station. Each of the assembling jigs and a corresponding component are positioned in sequence on the movable rail portion such that the advance movement of the movable rail portion moves the assembling jigs to an assembling position at the assembling station for sequentially carrying out the assembly of each component to the article.

DETAILED DESCRIPTION OF THE PREFERRED EMBODIMENTS

An example of a device to be assembled is an air cleaner $W_1$ which is a first component and a head cover $W_2$ which is a second component which are to be assembled in sequence onto an engine E which is the article.

Figure 1:
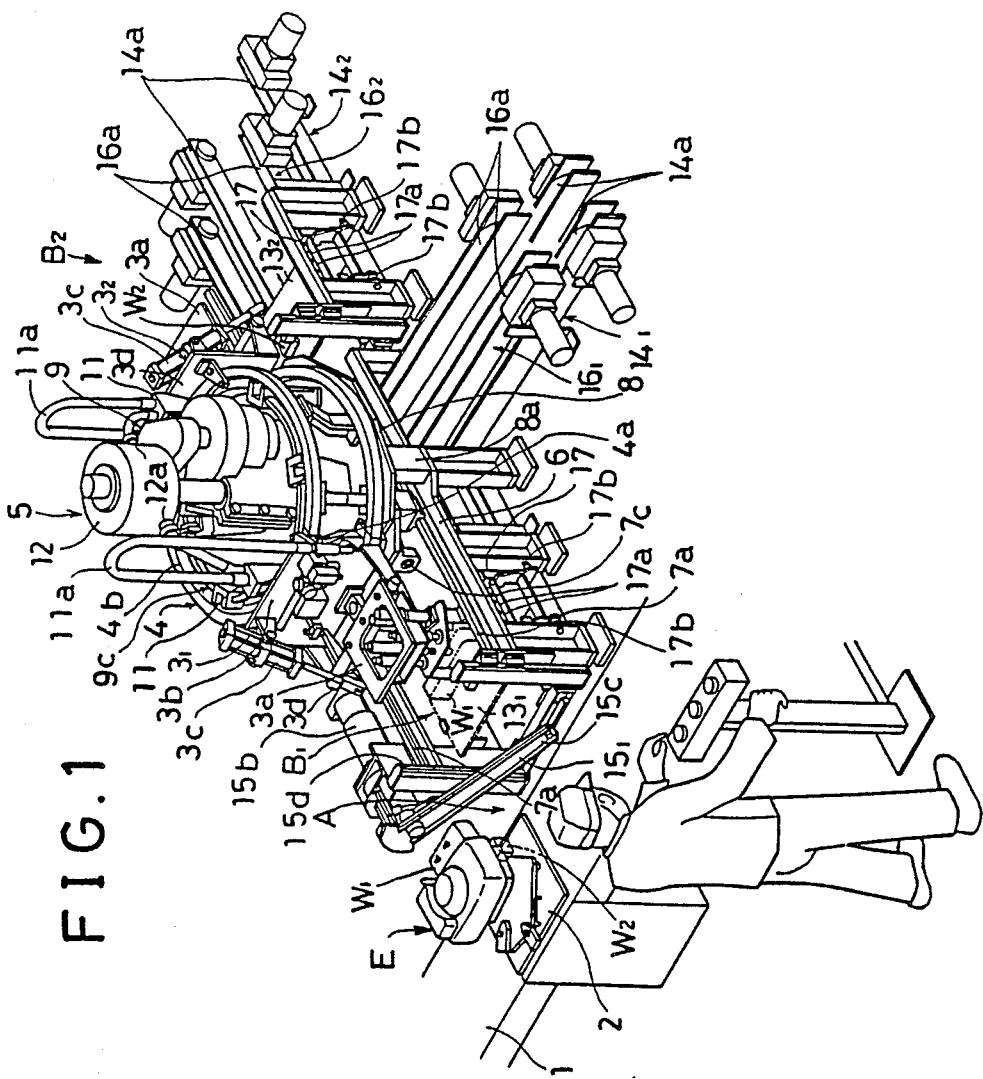
FIG. 1 is a perspective view of one embodiment of the present invention.
Figure 2:
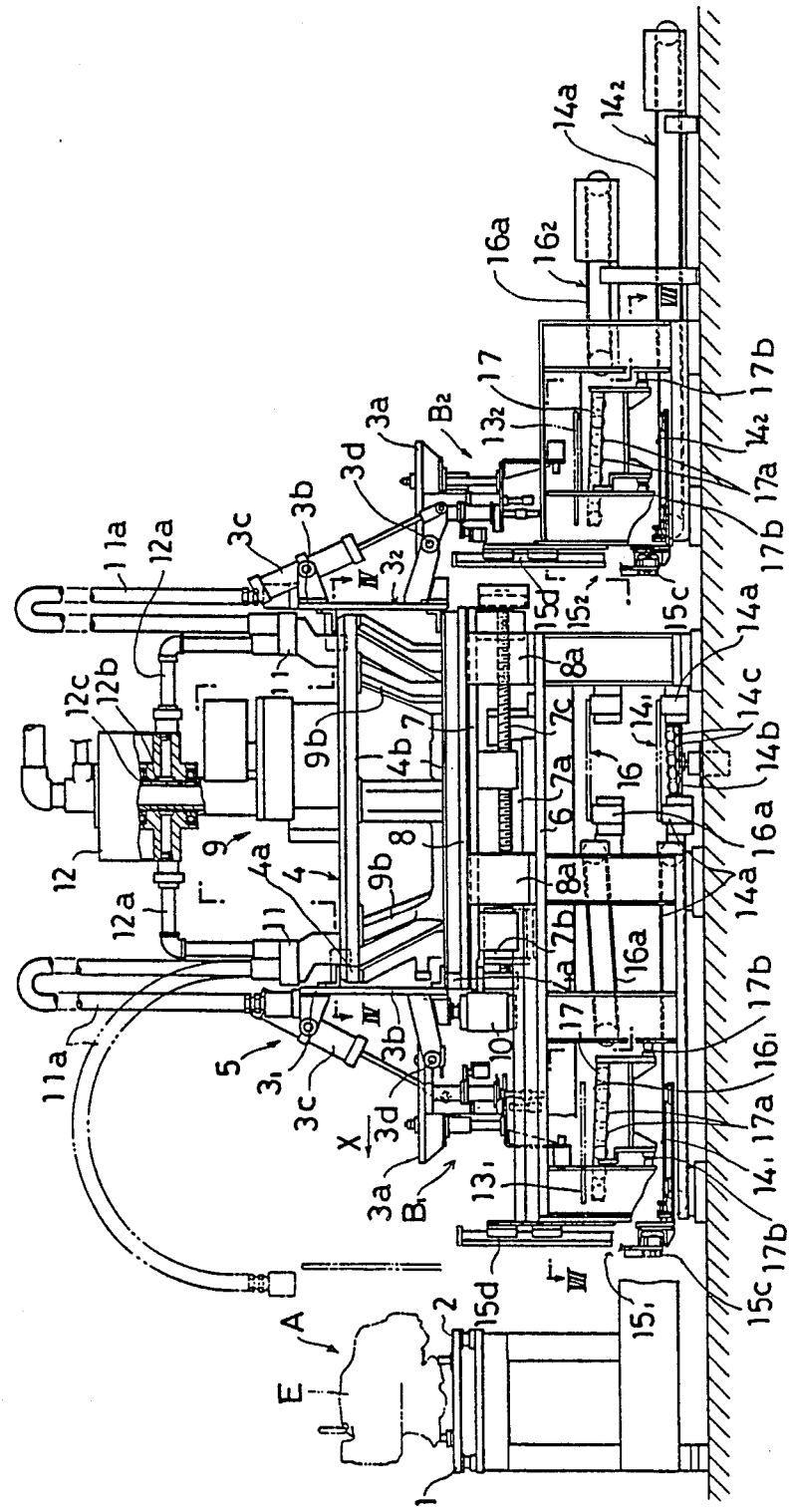
FIG. 2 is a front view thereof.

Referring to FIGS. 1 and 2, an assembly line 1 conveys the engine E on a pallet 2. An assembling apparatus 5 is provided on the side of an assembling station A on the assembly line 1 with a first assembling jig $3_1$ for the air cleaner $W_1$ and a second assembling jig $3_2$ for the head cover $W_2$. The assembling jigs $3_1$ and $3_2$ are mounted on an annular rail 4 so as to be movable circumferentially along on the annular rail 4. The portion of the annular rail 4 that is opposite to the assembling station A is formed with a movable rail 4a which is movable to advance toward and retract from the assembling station A, and the assembling jigs $3_1$ and $3_2$ are arranged such that each may be moved on the movable rail 4a, and additionally may then be moved to an assembling position at the assembling station A by the advance movement of the movable rail 4a.

Figure 3:
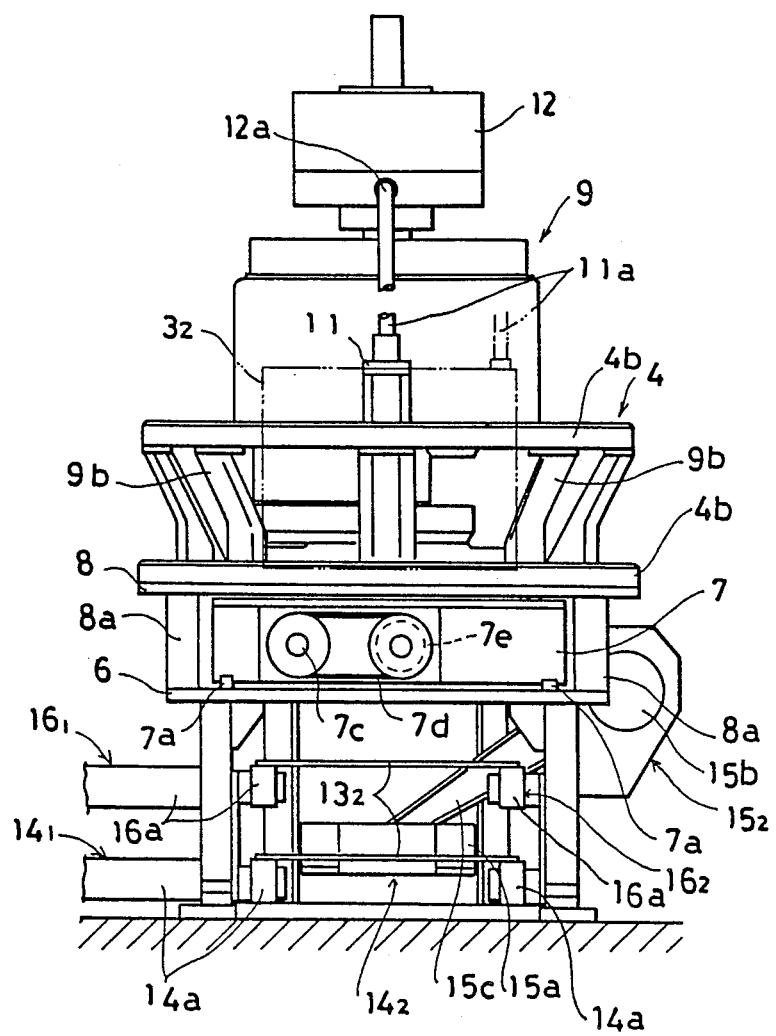
FIG. 3 is a right side view thereof.
Figure 4:
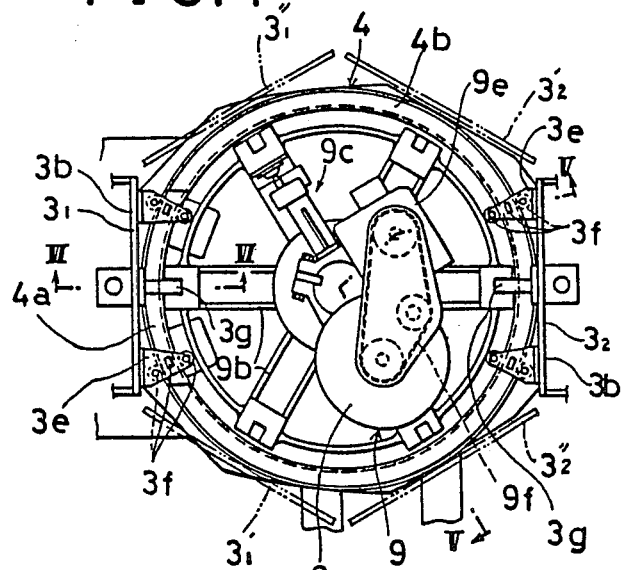
FIG. 4 is a sectional view taken along the line IV—IV in FIG. 2.
Figure 5:
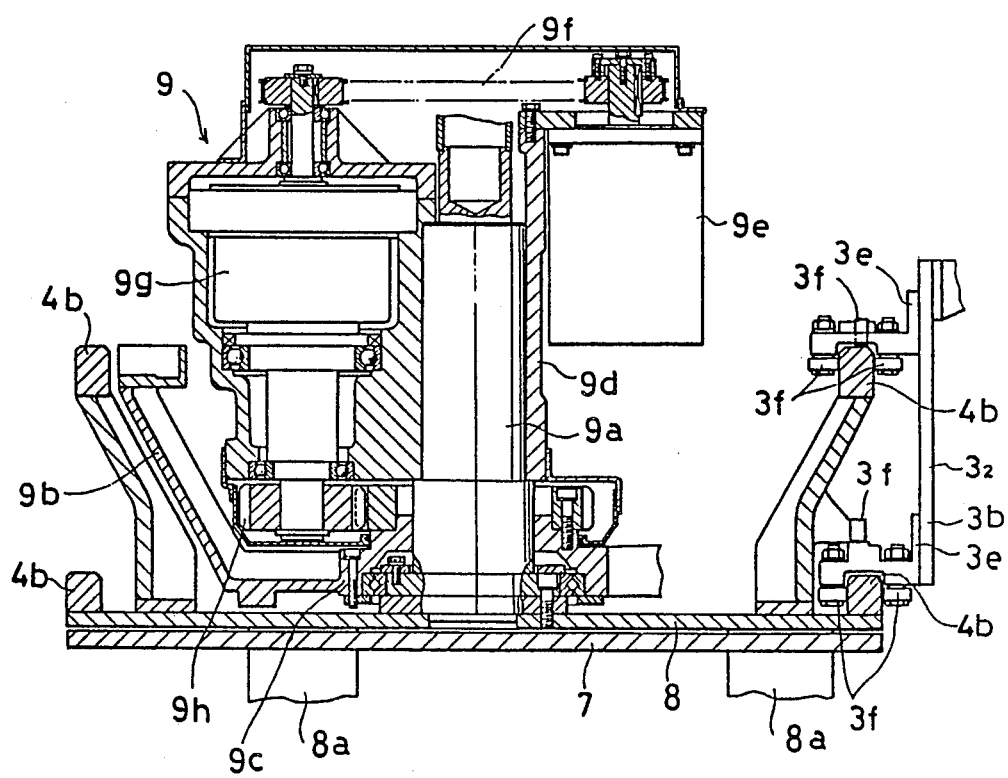

In more detail, the assembling apparatus 5 is constructed, as shown in FIGS. 2 and 3. The apparatus 5 comprises a machine base 6 and a slide table 7 which is movable to advance towards the assembling station A and retract therefrom along on a pair of guide rails 7a fixed on the machine base 6. A stationary base 8 is located above the slide table 7 and is fixed through leg members 8a to the machine base 6. As shown in FIGS. 4 and 5, a stationary rail 4b which is a portion, of the annular rail 4 is formed by a pair of upper and lower rails which are attached to the stationary base 8. The movable rail 4a is also formed of a pair of upper and lower rails which are attached to the slide table 7. The slide table 7 is provided on its lower surface with a screw rod 7c which extends along an X axis, that is, in the advancing and retracting direction of the table 7, as shown in FIG. 2. The rod 7c is in threaded engagement with a nut sleeve 7b on the machine base 6, and the slide table 7 is provided on its rear end portion with a servomotor 7e for rotating the screw rod 7c in the forward and reverse directions, through a belt 7d, as shown in FIG. 3.

Thus, by the forward and reverse rotations of the screw rod 7c by the motor 7e, the slide table 7 may be advanced and retracted in the X axial direction, and if the slide table 7 is retracted, the movable rail 4a is brought into alignment with the stationary rail 4b to form the annular rail 4. Thus, it is possible to move the assembling jig $3_1$ and $3_2$ around along on the annular rail 4 including the movable rail 4a.

Each of the assembling jigs $3_1$ and $3_2$ has a main body 3a provided with a component holding device and a nut runner supported on a supporting frame $3b$ provided on the rear portion thereof. The main body $3a$ is swingable about a shaft $3d$ by means of a cylinder $3c$ between a downwardly turned vertical orientation and a forwardly turned horizontal orientation. Each of the assembling jigs $3_1$ and $3_2$ are supported on the annular rail 4 by a pair of guide rollers $3f$ provided on a bracket $3e$ attached to a rear wall of the supporting frame $3b$, as shown in FIG. 5. Additionally, an index means 9 is provided on the stationary base 8 for moving the assembling jigs $3_1$ and $3_2$ circumferentially along the annular rail 4.

The index means 9, as shown in FIG. 5, includes an index member $9c$ having plural index arms $9b$ disposed radially and is rotatably supported on the outer circumference of a lower end portion of a supporting column $9a$ positioned on the stationary base 8 at the center of the annular rail 4. The member $9c$ is rotated through a belt $9f$, a reduction gear $9g$ and a gear $9h$, by a servomotor $9e$ mounted on machine frame $9d$ fixed to the supporting column $9a$.

Figure 6:
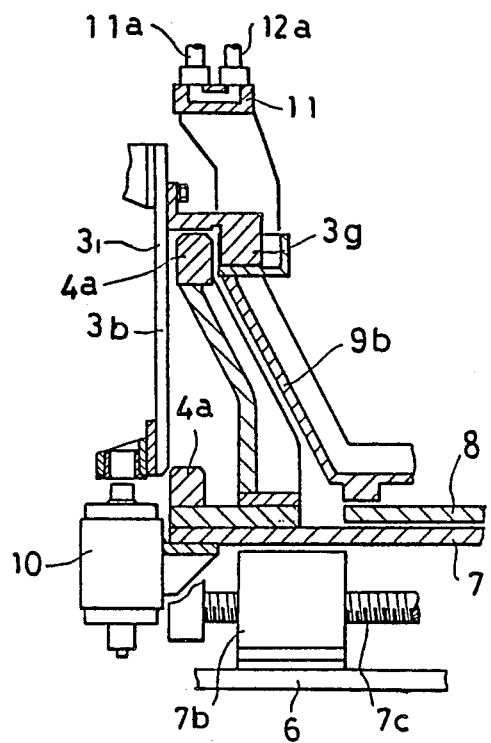
FIGS. 5 and 6 are sectional views taken along the line V—V and VI—VI in FIG. 4.

As shown in FIGS. 4 and 6, an engaging member $3g$ projecting from the rear wall of the supporting frame $3b$ of each of the assembling jigs $3_1$ and $3_2$, is engageable with a forward end of each index arm $9b$ and is moved into and out of engagement in the radial direction. By turning of the index member 9, the assembling jigs $3_1$ and $3_2$ may be given mutually synchronized movement in the circumferential direction of the annular rail 4. When the movable rail $4a$ is moved forward when an assembling jig $3_1$ or $3_2$ is selected, the engaging member $3g$ comes out of engagement with the index arm $9b$. In order that, at that time, the assembling jig $3_1$ or $3_2$ is held stationary in relation to the movable rail $4a$, a forward end portion of the slide table 7 is provided, with a docking cylinder 10 which is engageable with each assembling jig $3_1$ and $3_2$.

A pipe joint member 11 is attached to a forward end of each index arm $9b$, and branch pipes $12a$ diverge from a circular manifold 12, which is rotatably supported on an upper end portion of the supporting column $9a$. The branch pipes $12a$ are connected to each joint member 11, and a flexible pipe $11a$, connected to each diverged pipe $12a$, extends from each joint 11. Each flexible pipe $11a$ is connected to each assembling jig $3_1$ and $3_2$, and an external air source is connected to a supply pipe $12b$ provided at the center of the manifold 12 as shown in FIG. 2. In this manner, each assembling jig $3_1$ and $3_2$ may be provided with air for operating a holding device, the nut runner and the cylinder $3c$ thereof. Additionally, cables for supplying electric power to each of the servomotors $7e$ and $9e$ are inserted through a pipe $12c$ mounted on an inner circumferential surface of the pipe $12b$.

Supplying stations $B_1$ and $B_2$ for supplying the air cleaner $W_1$ and the head cover $W_2$, respectively, are provided outside of the circumference of the annular rail 4. In the illustrated example, a first supplying station $B_1$ for supplying the air cleaner $W_1$ which is to be assembled to the engine E first, is disposed at a position which is outside and opposite to the movable rail $4a$, that is, at a front position which is in front of the annular rail 4. A second supplying station $B_2$ for supplying the head cover $W_2$ is disposed at a rear position which is outside and to the rear of the annular rail 4. The first assembling jig $3_1$ and the second assembling jig $3_2$ are mounted on opposite sides of the annular rail 4 180 degrees out of phase in the circumferential direction, such that when the first assembling jig $3_1$ is selected to be positioned on the movable rail $4a$ by the index means 9, the second assembling jig $3_2$ is moved to a position that is coincident with the second supplying station $B_2$.

The respective supplying stations $B_1$ and $B_2$ are arranged such that the air cleaner $W_1$ set with bolts, and the head cover $W_2$ set with bolts, are supplied thereto on pallets $13_1$ and $13_2$ through respective conveying passages $14_1$ and $14_2$ such that when the respective pallets $13_1$ and $13_2$ are lifted by lifters $15_1$ and $15_2$ provided at the respective supplying stations $B_1$ and $B_2$, the air cleaner $W_1$ and the head cover $W_2$ on the respective pallets $13_1$ and $13_2$ are transferred to the respective assembling jigs $3_1$ and $3_2$, together with the bolts. The pallets $13_1$ and $13_2$ which are then empty, are then returned to respective predetermined set stations (not shown) through pallet returning passages $16_1$ and $16_2$ provided above the respective conveying passages $14_1$ and $14_2$.

Figure 7:
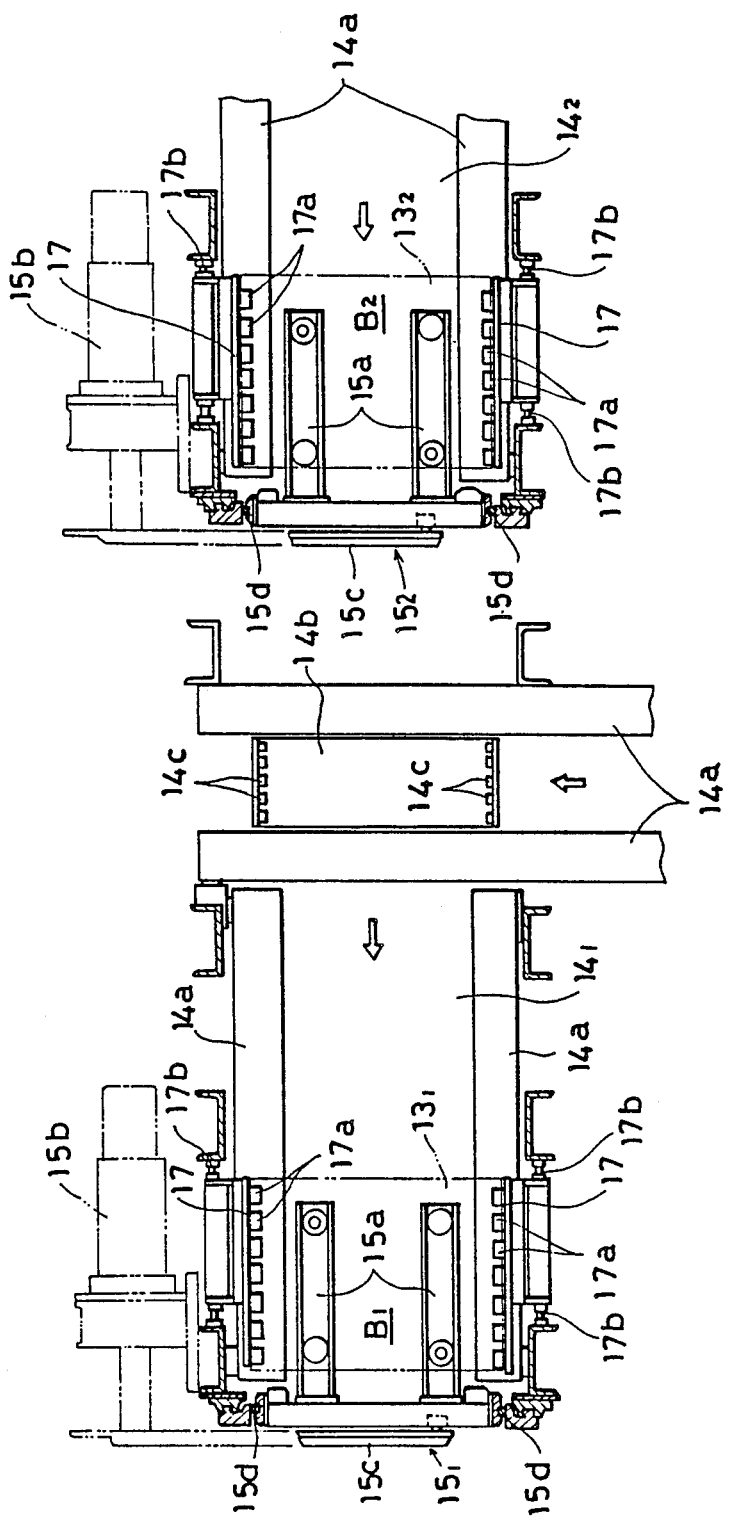
FIG. 7 is a sectional view taken along the line VII—VII in FIG. 2.

Each lifter $15_1$ and $15_2$ as shown in FIGS. 1 and 7, comprises a fork member $15a$ for supporting each pallet $13_1$ and $13_2$ and is movable upwards and downwards along guide rails $15d$, on the sides thereof by the upward and downward swing movements of a swingable arm $15c$ positioned to be moved by a servomotor $15b$. Additionally, receiving frames 17 each having a row of plural rollers $17a$ aligned in an inclined arrangement, receive the side edge portions of a lower surface of each pallet $13_1$ and $13_2$. As shown in FIG. 2, the receiving frames 17 are provided on both sides of each supplying station $B_1$ and $B_2$ and are movable to swing about a shaft $17b$ provided on a lower end portion thereof between an upwardly raised position and an outwardly lowered position. Thus, after each pallet $13_1$ and $13_2$ is lifted to a predetermined elevated position by the upward movement of the fork member $15a$, the two receiving frames 17 are raised, and in this condition, if the fork member $15a$ is moved downwards, then each pallet $13_1$ and $13_2$ may be supported by a roller group $17a$, and may be discharged to each pallet returning passage $16_1$ and $16_2$ due to the inclination thereof.

Belt conveyors $14a$ and $16a$ are provided in each of the conveying passages $14_1$ and $14_2$ and each of the returning passages $16_1$ and $16_2$, and an elevating frame $14b$ is provided at a corner portion of the first conveying passage $14_1$. The elevating frame $14b$ and the belt conveyers $14a$, cross at right angles with each other as shown in FIG. 7, and a row of plural rollers $14c$ are provided on each side portion of the elevating frame $14b$ and are inclined downwards towards the belt conveyer $14a$ extending towards the first supplying station $B_1$. Thus, the upward movement of the elevating frame $14b$ supports the pallet $13_1$ on the roller group $14c$ in an inclined manner for transfer to the belt conveyer $14a$.

Next, the operation of the foregoing embodiment will be explained as follows:

During conveying of the engine E, the first assembling jig $3_1$ is selected to be positioned on the movable rail $4a$, and the jig main body $3a$ thereof is swung downwards to take its vertical orientation. Meanwhile, the pallet $13_1$ supplied to the first supplying station $B_1$ is lifted by the lifter $15_1$, and the air cleaner $W_1$ and the bolts on the pallet $13_1$ are held by a holding device provided on the jig main body $3a$. Thereafter, the empty pallet $13_1$ is discharged to the pallet returning passage $16_1$ and the jig main body $3a$ is swung to take its horizontal orientation. Thus, the transferring operation of the air cleaner $W_1$ to the first assembling jig $3_1$ is completed.

After the engine E is conveyed into the assembling station A and is set in a predetermined position, the first assembling jig $3_1$ is moved to an assembling position of the assembling station A by the advancing or forward movement of the movable rail 4a, and the air cleaner $W_1$ is bolted to the engine E by operation of the nut runner.

During the transferring operation or the assembling operation of the air cleaner $W_1$ as described above, in almost the same manner as in the foregoing transferring operation, the second assembling jig $3_2$ located at a circumferential position facing the second supplying station $B_2$ is supplied with the head cover $W_2$ on a pallet $13_2$ from the second supplying station $B_2$.

After the completion of assembling of the air cleaner $W_1$ to the engine E, the movable rail 4a is retracted or moved backwards and thereafter, the first and second assembling jigs $3_1$ and $3_2$ are moved circumferentially on the annular rail 4 by 180 degrees, so that the second assembling jig $3_2$ is selected on the movable rail 4a, and the engine E is turned manually or automatically by 90 degrees such that its cylinder head is directed toward the X axis direction. Thereafter, the movable rail 4a is advanced, and thereby the second assembling jig $3_2$ is moved to the assembling position with the jig main body 3a thereof in its horizontal orientation, and the head cover $W_2$ is bolted to the cylinder head of the engine E. The engine E thus assembled is then conveyed from the assembling station A, and the next engine E to be assembled is conveyed into the assembling station. During this conveying operation, the first and second assembling jigs $3_1$ and $3_2$ are again moved circumferentially on the annular rail 4 by 180 degrees, such that the first assembling jig $3_1$ is selected on the movable rail 4a.

By repeating the foregoing procedures, the assembling of the air cleaner $W_1$ and that of the head cover $W_2$ to the engine E are carried out in sequence.

Thus, according to the foregoing example, when the first assembling jig $3_1$ is selected on the movable rail 4a, the air cleaner $W_1$ can be transferred thereto, and immediately after the engine E is conveyed into the assembling station A and is set in position, the movable rail 4a is advanced to assemble the air cleaner $W_1$ to the engine E and additionally, before the completion of assembling of the air cleaner $W_1$ thereto, the head cover $W_2$ can be transferred to the second assembling jig $3_2$, and as a result, the assembling of the head cover $W_2$ to the engine E can be carried out without loss of time required for transferring of the head cover $W_2$ after the assembling of the air cleaner $W_1$. Thus, the workability can be improved.

In the foregoing embodiment, six assembling jigs may be mounted circumferentially on the annular rail 4 at an interval of 60 degrees. If, in this case, as shown in FIG. 4, the first and second assembling jigs $3_1$ and $3_2$ are for a first type of engine, first and second assembling jigs $3_1'$ and $3_2'$ for a second type of engine, and further additional first and second assembling jigs $3_1''$ and $3_2''$ for a third type of engine may be mounted on the annular rail 4. This is advantageous because the assembling apparatus can comply with change in a type of an engine E to be assembled.

Figure 8:
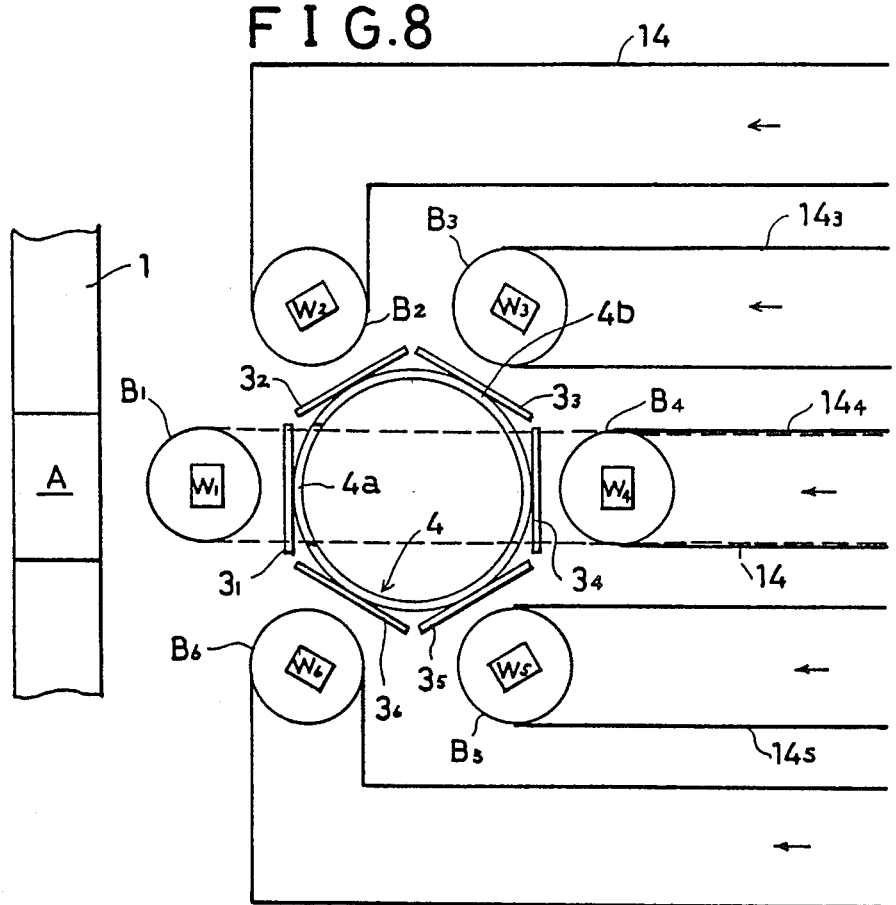
FIG. 8 is a top plan of a diagram showing a layout of an apparatus for assembling of six kinds of components.

Further, by using the foregoing assembling apparatus 5, six kinds of assembling members $W_1, W_2 \ldots W_6$ can be assembled to an article. FIG. 8 shows one embodiment thereof. This embodiment has an arrangement such that a first supplying station $B_1$ for a first assembling member $W_1$ which is to be assembled first is provided at a circumferential position of the movable rail 4a, and with the station $B_1$ being a starting point, the second to sixth supplying stations $B_2 \ldots B_6$ for second to sixth assembling members $W_2 \ldots W_6$ being disposed, in accordance with the assembling sequence thereof, around the annular rail 4 at circumferentially spaced positions at an interval of 60 degrees. The respective supplying stations $B_1, B_2 \ldots B_6$ are arranged to be supplied with the respective components $W_1, W_2 \ldots W_6$ through respective conveying passages $14_1, 14_2 \ldots 14_6$, and further it is arranged such that, when the first assembling jig $3_1$ for the first components $W_1$ is selected on the movable rail 4a, the second to sixth assembling jigs $3_2 \ldots 3_6$ for the second to sixth components $W_2 \ldots W_6$ are moved to respective stations which correspond to the second to sixth supplying stations $B_2 \ldots B_6$. Thus, prior to completion of assembling of the first components $W_1$ by the first assembling jig 31, the second to sixth assembling jigs $3_2 \ldots 3_6$ are transferred to the second to sixth components $W_2 \ldots W_6$, and thereafter the second to sixth assembling jigs $3_2 \ldots 3_6$ may be selected one after another on the movable rail 4a for effecting the sequential assembling of the second to sixth components $W_2 \ldots W_6$.

Figure 9:
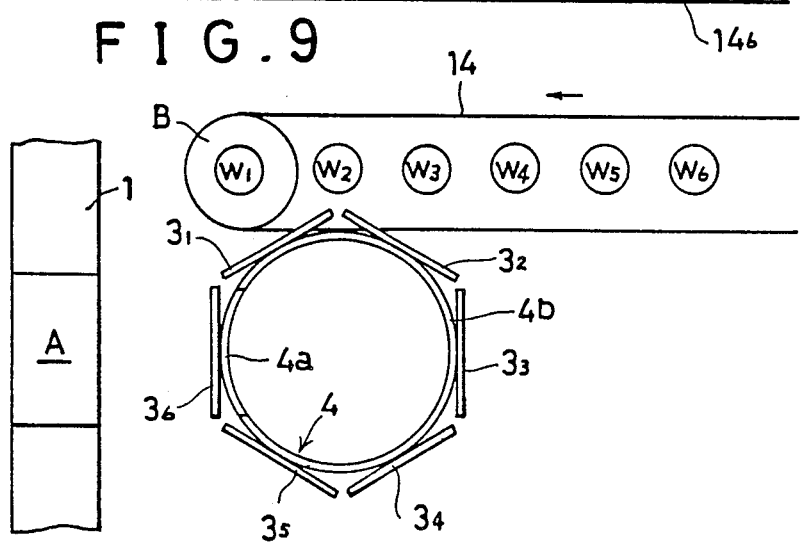
FIG. 9 is a top plan of a diagram showing a modified embodiment thereof.

In another embodiment shown in FIG. 9, a single supplying station B is provided to correspond to a circumferential position which is circumferentially displaced from the movable rail 4a by 60 degrees, and first to sixth components $W_1 \ldots W_6$ are supplied one after another to station B through a conveying passage 14. With this arrangement, first the first component $W_1$ is transferred to the first assembling jig $3_1$ at the supplying station B, and thereafter the first assembling jig $3_1$ is moved onto the movable rail 4a and the component $W_1$ is assembled to the article. During this operation, the second component $W_2$ is transferred to the second assembling jig $3_2$ at the station B, and the second assembling jig $3_2$ is then selected on the movable rail 4a, and the assembling of the second component $W_2$ to the article and the transferring of the third component $W_3$ to the third assembling jig $3_3$ at the station B are carried out at the same time. Thereafter, by nearly the same operations, assembling of the components and transferring of the next component are effected in sequence.

Thus, according to this invention, two or more kinds of components can be assembled to an article in sequence with high efficiency at a single assembling station, and the assembly line can be decreased in length and the installation cost for the apparatus can be lowered.

We claim:

1. An automatic assembling apparatus for assembling, in sequence, at least a first component and a second component to an article at an assembling station, said assembling apparatus comprising a first assembling jig for said first component and a second assembling jig for said second component; an annular rail means wherein said first and second assembling jigs are mounted on and circumferentially movable on said annular rail means; said annular rail means having an annular movable rail portion positioned opposite said assembling station which is movable to advance toward and retract from said assembling station; at least one supplying station positioned with respect to the circumference of said annular rail means for supplying components to said assembling jigs at said supplying station; wherein each of said assembling jigs and a corresponding component are positioned in sequence on said movable rail portion and, wherein the advance movement of the movable rail portion moves said assembling jigs to an assembling position at said assembling station for sequentially carrying out the assembly of each component to the article.

2. An automatic assembling apparatus as claimed in claim 1, wherein said at least one supplying station comprises a plurality of supplying stations, each supplying station supplying a corresponding component, wherein a first supplying station supplies said first component, which is to be the first component assembled to the article, at a circumferential position that is opposite to said movable rail portion such that when said first assembling jig for said first component is selected on said movable rail portion, a second assembling jig for said second component is moved to circumferential position that is opposite to a second supplying station for supplying said second component.

3. An automatic assembling apparatus as claimed in claim 1, wherein said at least one supplying station is a single supplying station positioned at a circumferential position not opposite to said movable rail portion, and wherein said components are supplied to said supplying station in accordance with the order of assembly thereof, whereby when an assembling jig is selected on said movable rail portion, said assembling jig for said component to be next assembled is moved to a position which is opposite to said supplying station.

4. An automatic assembling apparatus as claimed in claim 1, including a machine base, slide table means mounted on said machine base, and a stationary base means, wherein said movable rail portion is mounted on said slide table means, said slide table means being movable to advance and retract with respect to said assembling station and wherein said rail means includes a stationary rail portion, said stationary rail portion being mounted on said stationary base means.

5. An automatic assembling apparatus as claimed in claim 4, including indexing means, said assembling jigs being operatively coupled to said indexing means, wherein said indexing means moves said assembling jigs circumferentially around said rail means.

* * * * *